United States Patent
Ren et al.

(10) Patent No.: US 8,392,338 B2
(45) Date of Patent: *Mar. 5, 2013

(54) PRODUCT EFFICIENCY CALCULATOR SYSTEM AND METHOD

(75) Inventors: Shijin Ren, Racine, WI (US); Daniel A. Daggett, Waterford, WI (US); John D. Hamilton, Racine, WI (US)

(73) Assignee: Diversey, Inc., Sturtevant, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/198,897

(22) Filed: Aug. 5, 2011

(65) Prior Publication Data

US 2011/0289012 A1 Nov. 24, 2011

Related U.S. Application Data

(63) Continuation of application No. 11/863,359, filed on Sep. 28, 2007, now Pat. No. 7,996,327.

(51) Int. Cl.
*G06Q 30/00* (2012.01)
*G06F 17/00* (2006.01)
*G06G 7/00* (2006.01)

(52) U.S. Cl. ...................... 705/330; 705/400

(58) Field of Classification Search .................. 705/330, 705/400
See application file for complete search history.

(56) References Cited

U.S. PATENT DOCUMENTS

| | | | |
|---|---|---|---|
| 4,359,073 A * | 11/1982 | de Stoutz | 141/89 |
| 6,234,220 B1 | 5/2001 | Davis et al. | |
| 6,318,417 B1 | 11/2001 | Davis et al. | |
| 6,457,493 B1 | 10/2002 | Davis et al. | |
| 6,522,994 B1 | 2/2003 | Lang | |
| 6,530,477 B1 | 3/2003 | Martorano et al. | |
| 6,612,382 B2 | 9/2003 | King | |
| 6,699,007 B2 | 3/2004 | Huang et al. | |
| 6,722,506 B1 | 4/2004 | Nielsen et al. | |
| 6,726,438 B2 | 4/2004 | Chernoff et al. | |
| 6,915,268 B2 | 7/2005 | Riggs et al. | |
| 6,945,449 B2 | 9/2005 | Hengami | |
| 6,974,928 B2 | 12/2005 | Bloom | |
| 7,020,616 B1 | 3/2006 | Mabuchi et al. | |
| 7,136,830 B1 | 11/2006 | Kuelbs et al. | |
| 7,231,374 B1 | 6/2007 | Balasinski | |
| 2003/0200111 A1* | 10/2003 | Damji | 705/1 |
| 2004/0031535 A1* | 2/2004 | Russell et al. | 141/10 |
| 2009/0037234 A1* | 2/2009 | Gabrielson | 705/6 |

OTHER PUBLICATIONS

"Tide Coldwater Savings Calculator," Procter & Gamble (Oct. 12, 2005) http://www.tide.com/tidecoldwater/energysavingscalculator.jhtml, 1 page.
"Food Packaging: Efficiency's tough sell", Higgins, T. Kevin, www.foodengineeringmag.com, retrieved Mar. 26, 2010.
"Are your pallet partners cheating on you?", Susan Lacefield, Logistics Management, Feb. 2005, p. 57.

* cited by examiner

*Primary Examiner* — John Hayes
*Assistant Examiner* — Allen J Jung
(74) *Attorney, Agent, or Firm* — Michael Best & Friedrich LLP

(57) ABSTRACT

A method of using a computer system to inform a consumer about an efficiency associated with an improved packaging configuration for a cleaning product relative to a standard packaging configuration for the cleaning product. The method comprises inputting values from the consumer into the computer system using an input device and storing the input values in a memory, using a processor to calculate a packaging space efficiency and a packaging material efficiency, and using the processor to calculate a total cost savings from using the improved packaging configuration. The method further comprises calculating a storage cost savings based on the shipping-associated packaging space efficiency and the storage cost per unit volume; calculating a disposal cost savings based on the packaging material efficiency and the disposal cost per unit weight; adding the storage cost savings and the disposal cost savings; and displaying output to the consumer using the output device.

16 Claims, 22 Drawing Sheets

The BIB Packaging Efficiency Calculator

*- An easy-to-use tool presented by Global Product Safety at JohnsonDiversey under ResponsibleSolutions ™/MC to help quantify the packaging efficiency benefits of JohnsonDiversey's Bag-in-a-Box (BIB) over conventional 5-gallon pails and 2.5-gallon tighthead pails.*

In JohnsonDiversey's 5-gallon or 2.5-gallon Bag-in-a-Box (BIB), the primary packaging is a plastic bag with a dispensing spout. The bag is housed in a cardboard box or carton which is recyclable. Along with its packaging efficiency demonstrated later in this Calculator, BIB offers additional benefits because it:

- increases user safety;
- decreases wastes;
- uses renewable resources;
- enables easy lifting; and
- enables fast and easy dispensing.

Start the Calculator
240

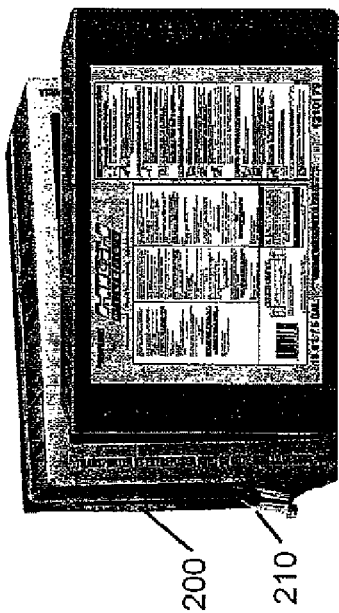

BIB Packaging Material Efficiency

An extremely important metric of environmental benefit related to source reduction of packaging material waste Packaging material efficiency refers to the amount of packaging material required to deliver each unit of product.

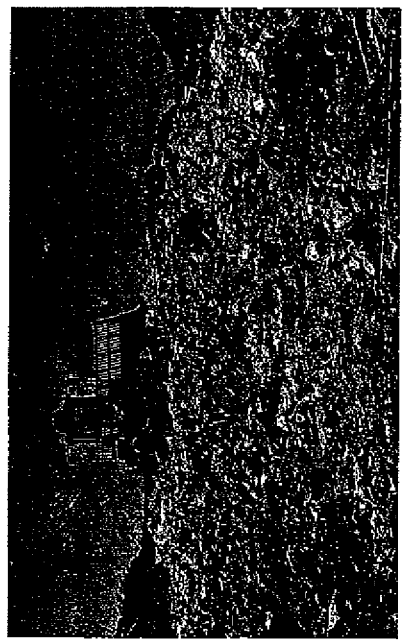

This is also the amount of less plastics that goes to landfill. With the plastics in pails being manufactured from a non-renewable resource, using BIBs helps reserve this valuable resource.

Comparing plastics use

Using a 5-gal BIB instead of a 5-gal pail helps reduce 2.74 pounds of plastics (i.e., 0.31 vs. 3.05 pounds)

With an annual use of 10,000 BIBs, the annualized savings in plastics is:

27,400 lbs per year

258

Next
Previous
Start page
260

FIG. 1C

BIB Packaging Space Efficiency

An extremely important metric of environmental benefit related to warehouse, shelf-space, transportation and disposal Packaging space efficiency refers to the storage and disposal volume required for each unit of product. — 264

262 —

Comparing warehouse logistics

Using 5-gal BIBs instead of 5-gal pails helps reduce storage space requirement by 0.11 cubic feet per gallon product (i.e., 0.21 versus 0.32 cubic feet per gallon). This is equivalent to 0.55 cubic feet per 5-gal BIB.

With an annual use of 10,000 BIBs, the annualized reduction in storage space requirement is:

5,500 cu. ft. per year

Comparing landfill volumes

Using 5-gal BIBs instead of 5-gal pails helps reduce landfill volume by 0.81 cubic feet per unit (i.e., 0.55 versus 1.36 cubic feet) after the units are disposed of.

With an annual use of 10,000 BIBs, the annualized reduction in landfill volume is:

8,100 cu. ft. per year

BIBs are more convenient to store than pails because of their shapes. BIBs can be triple- or even quadruple-stacked whereas pails can only be double-stacked. Considering the volume of a pallet of BIBs versus that of a pallet of pails, it is apparent that using BIBs helps increase the warehouse storage space efficiency. This can be of great logistical importance.

Using BIBs is also associated with reduced landfill volume. BIBs break down flat, producing less bulk in landfill than pails which stay rigid.

As a reference, a Chevrolet Suburban occupies a volume of approximately 750 cubic feet.

Next
Previous
Start page
— 266

FIG. 1D

BIB Cost Benefits

And by the way, some of the efficiencies can also be measured by cost...

Landfill — 274

| | | |
|---|---|---|
| Cost of landfilling solid wastes | 50 | $/ton |
| Annual savings in landfilling cost by using 5-gal BIBs: | 617 | $ |

Warehouse storage — 276

| | | |
|---|---|---|
| Cost of warehouse storage: | 2.5 | $/cu. ft./year |
| Annual savings in warehouse storage cost by using 5-gal BIBs: | 13,750 | $ |

Total annual savings in costs — 278

Using BIBs instead of pails is associated with an estimate annual savings in costs of 14,367   $

Next
Previous
Start page — 280

Additional cost savings opportunities are associated with BIB's safety features. For example, the rectangle BIBs are more stable than the round plastic pails which minimizes tipping or collapsing pallet loads during shipment and handling. Therefore, the potential costs for time lost or health care expenditures related to injuries are reduced. — 282

FIG. 1F

The AccuMix® Packaging Efficiency Calculator

*- An easy-to-use tool presented by Global Product Safety at JohnsonDiversey under ResponsibleSolutions^TMMC to help quantify the packaging efficiency benefits of AccuMix® over conventional pails.*

JohnsonDiversey's AccuMix® is the unique cleaning system with a built-in accurate measuring spout. Simply loosen the cap, squeeze and pour the concentrate into a bucket or scrubber tank. Through its intelligent design, AccuMix® helps achieve:

- the right proportions every time,
- hassle-free measuring, and
- reduced product waste.

Start the Calculator
——— 300

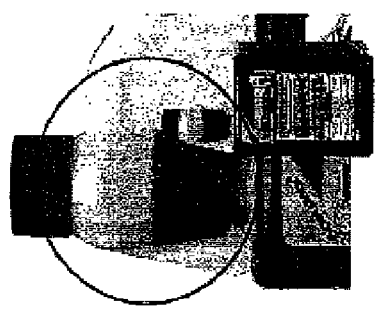

The accurate solution: built-in measuring spout

FIG. 2A

General Information

| AccuMix® | | |
|---|---|---|
| Capacity: | 32 (0.946 liters) | oz |
| Weight (plastics) | 0.15 | lb |
| Shipping volume | 0.07 | cu. ft |
| Units per pallet | 360 | |
| Pallet volume | 38 | cu. ft. |
| Pallet volume per gallon | 0.4 | cu. ft./gal |

— 302

| 2.5-Gallon Pail | | |
|---|---|---|
| Capacity | 2.5 | gal |
| Weight (plastics) | 1.47 | lb |
| Shipping volume | 0.71 | cu. ft |
| Units per pallet | 40 | |
| Pallet volume | 40 | cu. ft. |
| Pallet volume per gallon | 0.4 | cu. ft./gal |

— 304

*Just a few simple questions before we start...*
Are the products used at a single dilution rate for all applications?
Is the number of AccuMix® or pail units consumed per year known?

— 306

*Base on your answers, click below to proceed.*

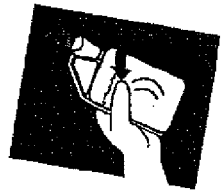

Default
Option 1
Option 2

Introduction

— 308

FIG. 2B

Default Calculations

Select Packaging Type and Enter Annual Consumption

2.5-Gallon Pail    1,000    units per year — 310

Enter Product Dilution Rates

AccuMix®         2.5-Gallon Pail
1  :  1000        1  :  1         — 312

*Based on the above information, the known or estimated annual consumptions are...*

AccuMix®              2.5-Gallon Pail
20                    1,000
units per year        units per year
(estimated)           (known)         — 314

↑ 316

Next
General Information
Introduction

AccuMix® Packaging Material Efficiency

*An extremely important metric of environmental benefit related to source reduction of packaging plastic waste*

Packaging material efficiency refers to the amount of plastic packaging required to deliver each unit (e.g., one liter) of end-use product.

Comparing plastics use

Using AccuMix® instead of pails helps reduce 1,467 pounds of plastics used with the selected packaging types and annual consumptions.

318

This may also be the amount of less plastics that goes to landfill

The majority of today's plastics is manufactured from a non-renewable resource. Using AccuMix helps reduce the amount of plastics used and thus helps reserve this valuable resource while reducing the environmental pollutant generation associated with manufacturing of plastics.

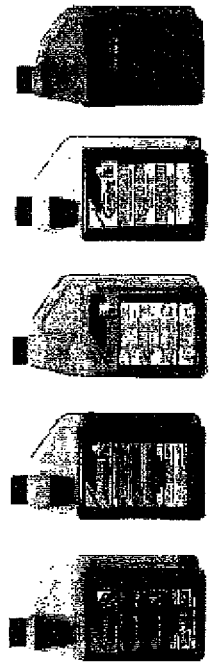

Next
General Information ⟩ 320

FIG. 2D

AccuMix® Packaging Space Efficiency

*An extremely important metric of environmental benefit related to warehouse, shelf-space, transportation and disposal*

Packaging space efficiency refers to the storage volume required for each unit (e.g., one liter) of end use product.

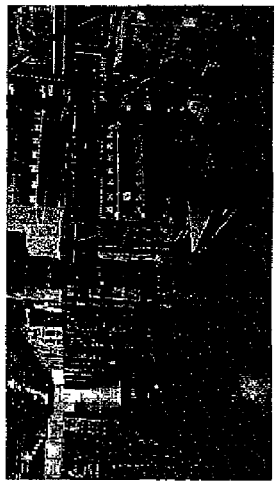

As a reference a Chevrolet Suburban occupies a volume of approximately 750 cu. feet

Comparing warehouse logistics

Using AccuMix® instead of pails helps reduce 998 cu. feet of warehouse storage space requirement with the selected packaging types and annual consumptions. This can be of great logistical importance.

322

Next
Previous
General Information

AccuMix® Cost Benefits

*And by the way, some of the efficiencies can also be measured by cost....*

Landfill

| | | |
|---|---|---|
| Cost of landfilling solid wastes: | 50 | $/ton |
| Annual savings in landfilling cost by using AccuMix® with the selected packaging types and annual consumptions: | 33 | $ |

— 332

Warehouse storage

| | | |
|---|---|---|
| Cost of warehouse storage: | 2.5 | $/cu. ft./year |
| Annual savings in warehouse storage cost by using AccuMix® with the selected packaging types and annual consumptions: | 2,495 | $ |

— 334

Total annual savings in costs

| | | |
|---|---|---|
| Using AccuMix® instead of pails is associated with an estimate annual savings in costs of | 2,528 | $ |

— 336

Next
Previous
General Information
— 338

FIG. 2G

Option 2 Calculations 350

Step 1a. AccuMix®
Define dilution scenarios (up to 3 applications)

| Application | Application 1 | Application 2 | Application 3 |
|---|---|---|---|
| Frequency per month | 24 | 4 | |
| Product use dilution rate | 1024 | 512 | |

Step 1b. Pail
Define dilution scenarios (up to 3 applications)

| Application | Application 1 | Application 2 | Application 3 |
|---|---|---|---|
| Frequency per month | 28 | | |
| Product use dilution rate | 40 | | |

Step 2.
Enter cleanable area per location: — 354

20,000 sq. ft./day

Step 3.
Enter number of locations: — 356

10 location(s)

Step 4a. AccuMix®
Enter product (as used) coverage rate: — 358

2,000 sq. ft./gal

Notes 352
*Annual consumptions for floor care products are calculated based on assumptions on cleanable area, product coverage rate, and product use frequency and dilution rate shown above.*

Total cleanable area
200,000 sq. ft./day

Step 4b. Pail
Enter product (as used) coverage rate: — 360

2,000 sq. ft./gal

*Based on the above information, the estimated annual consumptions are...* 364

| AccuMix® | 2.5-Gallon Pail |
|---|---|
| 141 units per year (estimated) | 328 units per year (estimated) |

Next
General Information
Introduction

The RTD Packaging Efficiency Calculator

- An easy-to-use tool presented by Global Product Safety at JohnsonDiversey under ResponsibleSolutions ™/MC to help quantify the packaging efficiency benefits of RTD over conventional RTU.

JohnsonDiversey's hand-held Ready-to-Dispense (RTD™) represents a true innovation in environmental stewardship and emerging plastic technologies. Through its patented design, RTD delivers:

- portability with user safety,
- accuracy and reliability in dilution control, and
- minimization of "left-over" waste of dispensed product.

RTD enables a paradigm shift from conventional Ready-to-Use (RTU) systems for Industrial & Institutional cleaning. Compared to RTU, RTD features:

- packaging material efficiency, and
- packaging space efficiency.

Start the Calculator — 400

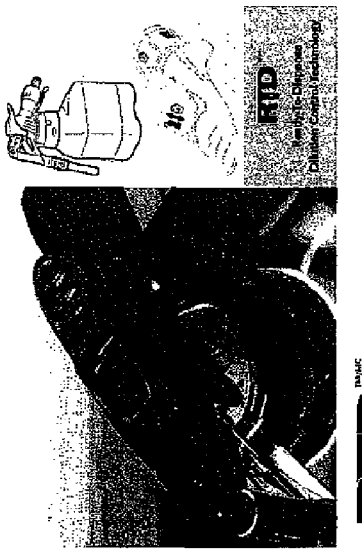

FIG. 3A

PRODUCT EFFICIENCY CALCULATOR SYSTEM AND METHOD

CROSS-REFERENCE TO RELATED APPLICATIONS

This application is a continuation of U.S. patent application Ser. No. 11/863,359, filed Sep. 28, 2007, now U.S. Pat. No. 7,966,327, the content of which in incorporated herein by reference in its entirety.

BACKGROUND OF THE INVENTION

1. Field of the Invention

Embodiments of the invention relate generally to packaging space and material efficiency analysis. More specifically, embodiments relate to tools for comparing the relative efficiencies of packaging configurations for a cleaning product.

2. Description of the Related Art

Many improved types of packaging are available to ship cleaning products more efficiently, for example, by allowing a more concentrated form of the product to be shipped to the consumer or by packaging the product in a more compact form having a smaller shipping volume for the same volume of product. Reducing the amount of packaging in turn reduces the amount of plastics consumed, which has environmental and cost benefits.

SUMMARY OF THE INVENTION

In one embodiment the invention is a method of using a computer system to inform a consumer about an efficiency associated with an improved packaging configuration for a cleaning product relative to a standard packaging configuration for the cleaning product, the computer system including an input device, an output device, a memory, and a processor. The method includes inputting values from the consumer into the computer system using the input device and storing the input values in the memory. The method further includes using the processor to calculate a packaging space efficiency including calculating a reduction in a shipping volume, a storage volume, or a disposal volume required to deliver one unit volume of end-use cleaning product using the improved packaging configuration. The method also includes using the processor to calculate a packaging material efficiency including calculating a reduction in the weight of plastic packaging material required to deliver one unit volume of end-use cleaning product using the improved packaging configuration. The method further includes calculating using the processor a total cost savings from using the improved packaging configuration. The method also includes displaying to the consumer using the output device at least one of the total cost, the disposal cost savings, or the storage cost savings for the standard packaging configuration; the total cost, the disposal cost, or the storage cost for the improved packaging configuration; the packaging space efficiency; and the packaging material efficiency.

In another embodiment the invention is a computer-readable medium including instructions for executing the above-described methods on a computational device.

In yet another embodiment the invention is a computer-based system for informing a consumer about an efficiency of an improved packaging configuration for a cleaning product, including a processor and a storage medium. The storage medium includes program instructions executable by the processor for executing the above-described methods.

In another embodiment the invention is a graphical user interface for display on a computer system for informing a consumer about an efficiency of an improved packaging configuration for a cleaning product. The graphical user interface includes an introduction page, a general information and input page, a packaging material efficiency page, a packaging space efficiency page, a transportation efficiency page, and a cost benefits page.

BRIEF DESCRIPTION OF THE DRAWINGS

Other objects and advantages of the invention will become apparent upon reading the following detailed description and upon reference to the accompanying drawings in which:

FIGS. 1A-1F are screen shots corresponding to a first embodiment of the invention;

FIGS. 2A-2I are screen shots corresponding to a second embodiment of the invention;

FIGS. 3A-3D are screen shots corresponding to a third embodiment of the invention;

DETAILED DESCRIPTION. OF THE INVENTION

Figure 1B:
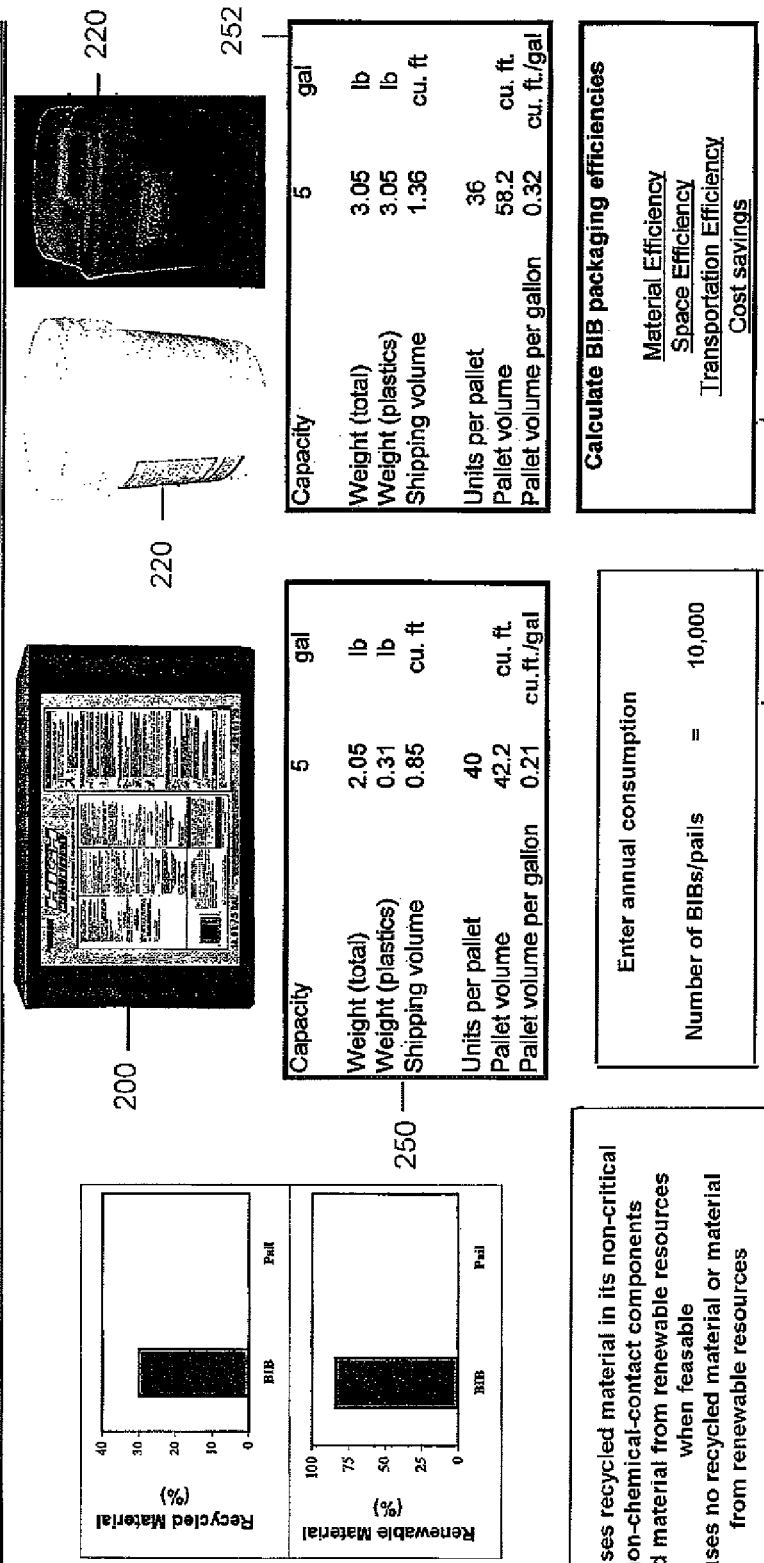

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including,". "comprising," or "having" and variations thereof herein is meant to encompass the items listed thereafter and equivalents thereof as well as additional items.

Informing consumers of the economic and environmental advantages of more efficient modes of packaging and delivery of products can encourage use of such packaging and delivery modes. Business consumers in particular may need to see the advantages to the bottom line that are associated with more efficient packaging of products in order to justify purchase of such products, particularly where adopting an improved packaging configuration could require changes in procedures at a company.

Given the complexities of determining costs associated with a product's packaging, the purchaser of a product may make a purchase decision based only on the primary factor of the product's per-unit cost, and the consumer may not appreciate the full cost savings resulting from a particular packaging configuration. For example, the purchaser of a cleaning product may not consider external costs arising from a purchase, such as those associated with shipping, storage, and disposal of the product and its packaging, as well as environmental impacts such as greenhouse gas emissions. Nonetheless, cost savings due to external factors associated with improved packaging configurations can be especially large for commercial consumers who buy substantial quantities of units of a given cleaning product each year. In addition, reductions in greenhouse gases such as carbon dioxide ($CO_2$) may give rise to credits that can be traded or sold, e.g. as part of a "cap and trade" program.

A computer program that takes into account the relevant external factors and demonstrates cost savings and other benefits of various improved packaging configurations to a consumer would help the consumer make a better-informed decision regarding the appropriate packaging configuration to use for shipping a product, in particular a cleaning product.

Accordingly, disclosed herein is a product efficiency calculator program and method for interactively demonstrating the advantages of using an improved packaging configuration as compared to a standard packaging configuration, for cleaning products, e.g. liquid or powder cleaning products. The program demonstrates the quantitative and qualitative efficiencies associated with the use of improved packaging configurations for the cleaning product. The program allows a user, e.g. the consumer of the cleaning product, to estimate cost savings and view other advantages associated with the use of improved packaging configurations. In addition, the program conveys information to the user regarding the products that are available and the relative advantages of the products.

In order to make the calculated estimates match the user's actual product usage more closely, and thereby make the program more useful and relevant, the program permits the user to set parameters. Settable parameters include, for example, the number of units of product consumed annually, the type of packaging currently used, the concentration of product in the packaging, the amount the product is diluted for one or more different uses, the distance that the product is shipped to the end user, and the fuel efficiency of the transportation vehicle. The user can change parameters interactively and receive immediate feedback regarding the effect on the efficiencies associated with use of a particular type of packaging.

The calculator program presents information in a useful format. In some embodiments, the user is presented with a combination of graphics and text, including user-modifiable text fields, on a collection of "pages". The user navigates through the program by clicking on one of several links on a given page, for example, using a cursor that is driven by a computer mouse. On some pages, the user can enter values in fields to customize the calculations and hence to make the reported values more relevant to the user's actual product usage. In some embodiments, the calculator program contains a default value for each user-modifiable value. In one embodiment, entry of an updated value in one field on a given page leads to updating of all relevant fields on that page and related pages. Within a given page, information may be organized within sub-panels to simplify presentation and entry of information.

Navigable screens, also referred to as modules, include:

Introduction page: describes the types of packaging (standard and improved) that are to be compared;

General information and input page: displays and permits user modification of one or more general attributes of the standard and improved packaging configurations, including: product capacity (volume), total shipping weight per unit package; shipping weight of plastics per unit package, shipping volume per package, package units per pallet for shipping, pallet volume, pallet volume normalized per gallon of product, and the number of units of product consumed annually;

Dilution page: in some embodiments, the user can specify one or more dilutions at which the product is used, to help estimate the amount of product that is consumed annually, since the product may be used at several different concentrations for different cleaning applications;

Packaging material efficiency page: displays the material efficiencies associated with use of less packaging material, in particular the reduced weight of plastic material generated through the use of the improved packaging configuration;

Packaging space efficiency page: displays the space efficiencies associated with packaging that allows the product to be shipped and stored at higher densities with less packaging and also requires less landfill space to be needed for disposal;

Transportation efficiency page: displays the efficiencies of transportation, which arise, for example, from higher-density packaging that in turn allows more product to be shipped with fewer trucks; and Cost benefits page: displays the cost savings from having to purchase less warehouse space and/or having to pay for less landfill space.

Figure 5:
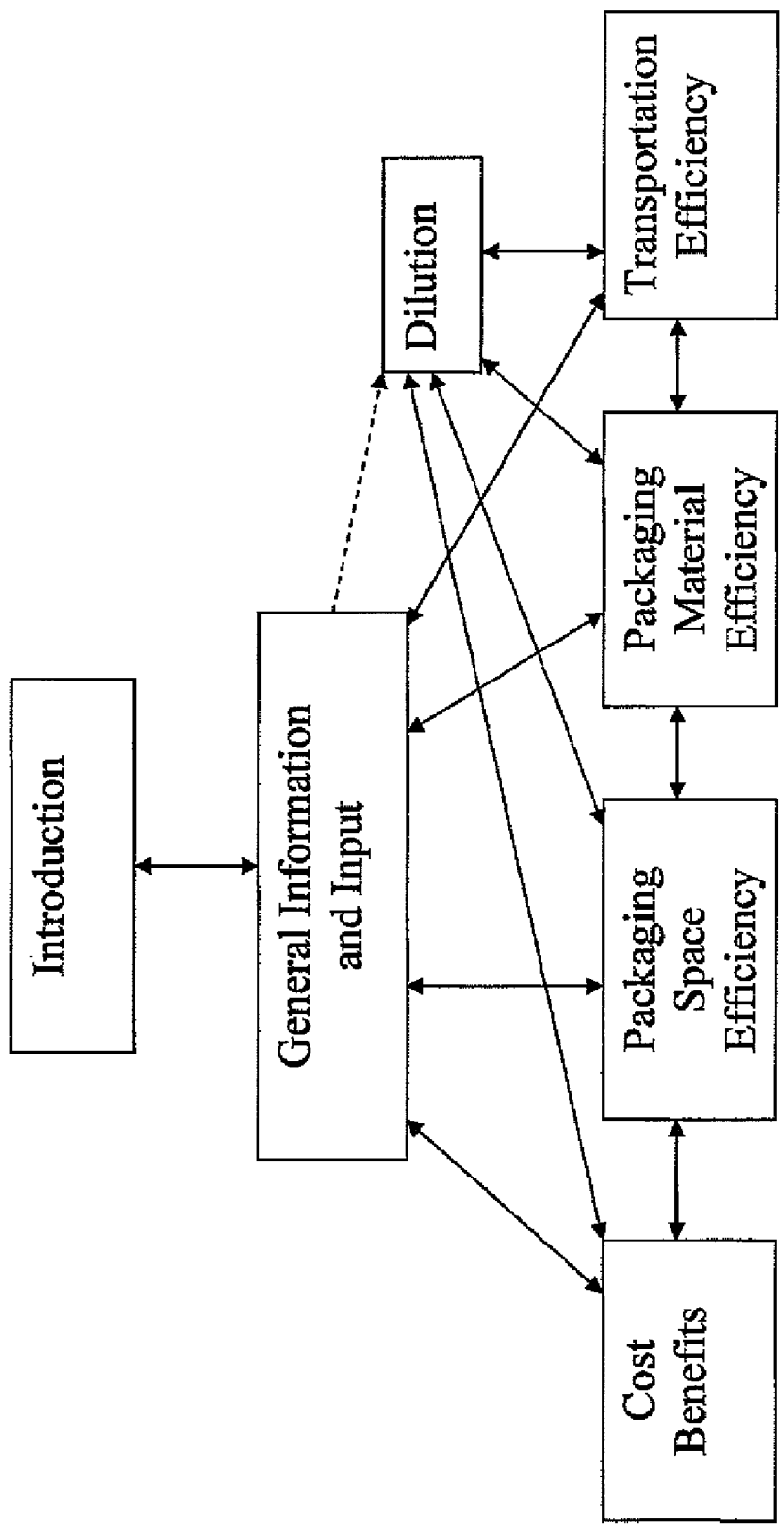
FIG. 5 is a system chart depicting one embodiment of a product efficiency calculator program.

In one embodiment, the calculator program starts at the Introduction page and the user then clicks a link to navigate to the General information/input page. In some embodiments, the user can navigate from the General information/input page to the Dilution page. From the General information/input page (or Dilution page) the user can then navigate to the Packaging material efficiency page, the Packaging space efficiency page, the Transportation efficiency page, and/or the Cost benefits page (FIG. 5).

In general, the efficiencies that are analyzed and reported by the calculator program are due to improved packaging configurations for the product contained in the package, namely a cleaning product such as a liquid or powder cleaning product. A "packaging configuration" refers to the packaging material of a package, for example, the volume of the package and whether it is a pail, bottle, or other form, along with any features of the package that improve or affect efficiency. Examples of features include a bag inside a box ("BIB"); a built-in measuring spout; and a built-in diluting dispenser. In the former case, the bag inside a box improves efficiency by allowing the stored cleaning product to occupy a greater percentage of the shipping volume than for standard packaging configurations, producing a high packing density. In the two latter cases, the features improve efficiency by facilitating the use of more concentrated stock solutions of cleaning product, because these features allow for very accurate dilution of the concentrated stock solution into final-strength, working solutions.

Improvements in packaging efficiencies can arise from packaging material efficiencies as well as packaging space efficiencies. Packaging material efficiency refers to a net reduction in the weight of packaging material, such as plastic, that is realized by using an improved packaging configuration. Packaging space efficiency refers to a net reduction in volume of packaging material that is realized by using an improved packaging configuration. Each of these efficiencies can result in cost savings, for example, due to reduced storage costs or reduced disposal costs.

To the extent that specific units of measure are used for input or output, the calculator program can convert the units between various known measurement systems such as the metric system or English units (e.g. pounds, inches, gallons, miles, etc.). Thus, the results presented by the calculator program are relevant to users from various countries using a variety of unit systems.

Quantitative information may be presented to the user as numbers, or may take the form of a non-numerical representation of the numerical value, such as a graphical representation including a bar graph, line graph, pictorial chart, or other non-numerical representation.

Information may be displayed to the user in a variety of formats, including pictorial, textual, numerical, non-numerical, graphical (FIG. 1B), tables, and lists. Information may also be conveyed in the form of hypertext or other types of links that guide a user to another source of information such as another page within the same calculator program.

Figure 4:
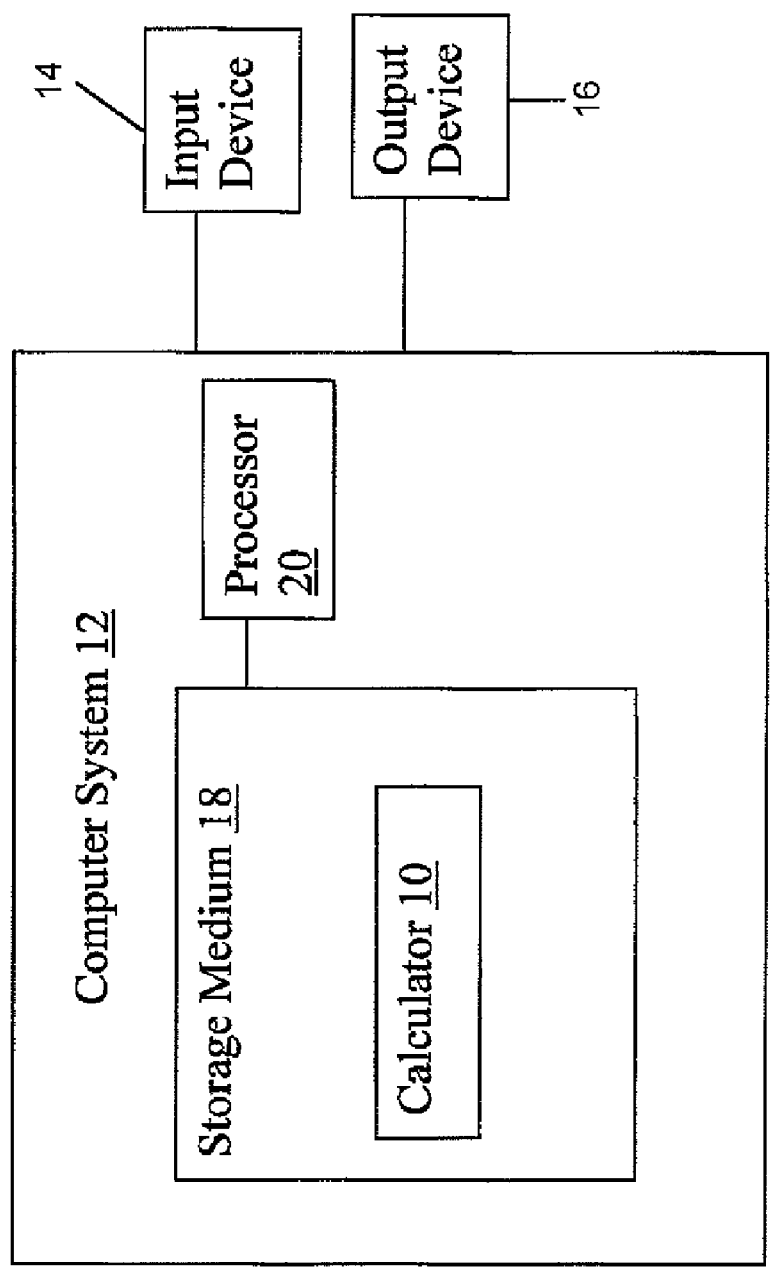
FIG. 4 is a block diagram of a computer system for implementing an embodiment of a product efficiency calculator program.

In one embodiment, the calculator 10 is implemented on a computer system 12, having an input device 14, an output device 16, a storage medium 18, and a processor 20 (FIG. 4). Possible input devices 14 include a keyboard, a computer mouse, a touch screen, and the like. Output devices 16 include a cathode-ray tube (CRT) computer monitor, a liquid-crystal display (LCD) computer monitor, and the like. Storage media 18 include various types of memory such as a hard disk, RAM, flash memory, and other magnetic, optical, physical, or electronic memory devices. The processor 20 is any typical computer processor for performing calculations and directing other functions for performing input, output, calculation, and display of data in the disclosed calculator. The calculator 10 comprises a set of instructions and data that are stored on the storage medium 18. The data associated with the calculator 10 can include image data and numerical data.

In one embodiment, the calculator program is implemented as a web page. In another embodiment, the calculator program is implemented as a locally-controlled program on a personal computer. In one particular embodiment, the calculator is implemented within a spreadsheet program such as MICROSOFT EXCEL®. In still another embodiment, the calculator program is implemented on a personal digital assistant (PDA), cell phone, or other hand-held electronic device.

Figure 6:
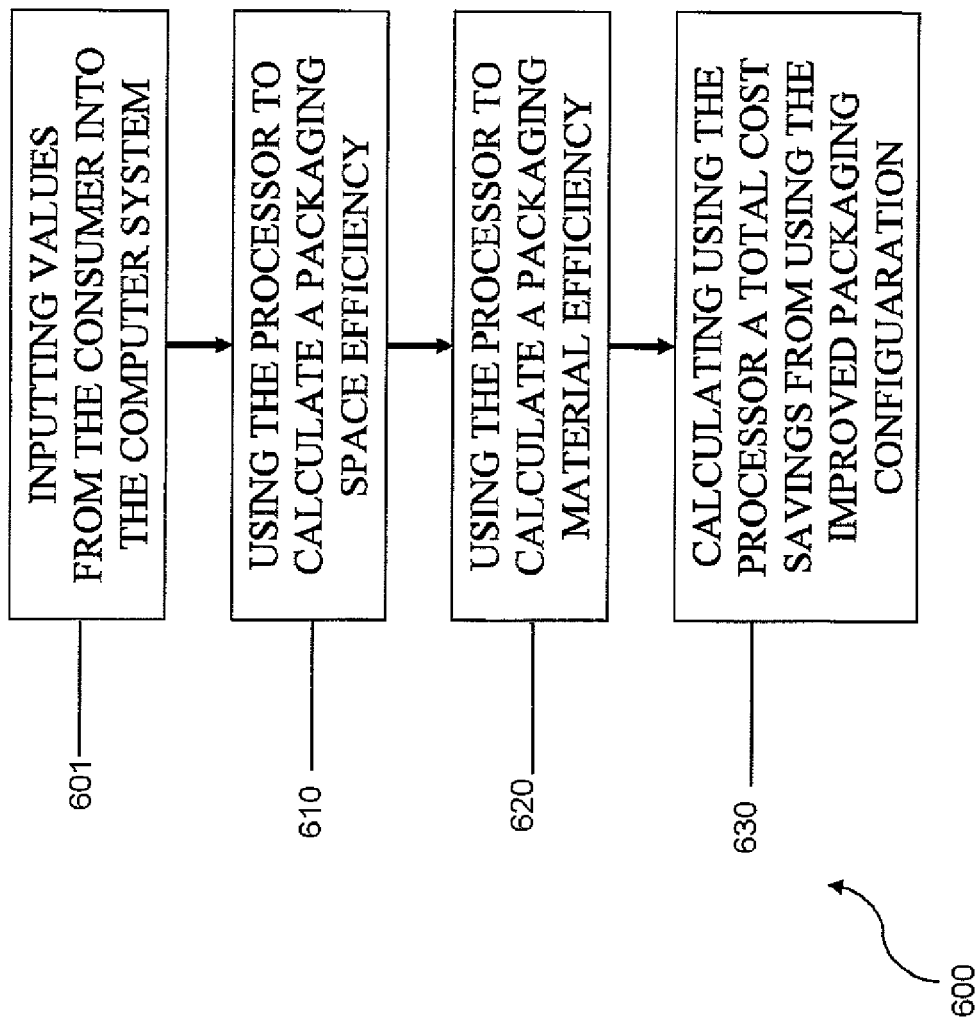
FIG. 6 is a flow chart of one embodiment of a method of using a computer system to inform a consumer about an efficiency associated with an improved packaging configuration for a cleaning product relative to a standard packaging configuration for the cleaning product.

One embodiment of a method 600 of using a computer system to inform a consumer about an efficiency associated with an improved packaging configuration for a cleaning product relative to a standard packaging configuration for the cleaning product comprises inputting values from the consumer into the computer system (task 601); using the processor to calculate a packaging space efficiency (task 610); using the processor to calculate a packaging material efficiency (task 620); and calculating using the processor a total cost savings from using the improved packaging configuration (task 630) (FIG. 6). However, other embodiments are possible and are within the scope of the invention.

First Embodiment

Bag-in-Box

In a first embodiment, a product efficiency calculator 10 calculates and presents efficiencies associated with the use of an improved "Bag-in-Box" (BIB) packaging configuration 200 (FIG. 1A) compared to a standard pail packaging configuration, for example, a 2.5- or a 5-gallon pail (FIG. 1B). In one embodiment in which the cleaning product is a liquid, the BIB packaging configuration 200 includes a liquid-tight bag that is contained in a box. The box in one embodiment is cardboard, which in one particular embodiment is constructed at least in part from recycled material. The bag includes a dispenser 210 that is embedded in the wall of the box and can be accessed without opening the box. The contents of the bag may be a liquid cleaning product in a concentrated form, or in a non-concentrated form suitable for end use. In another embodiment in which the cleaning product is in a non-liquid form, such as a powder, the BIB packaging configuration 200 includes a bag, suitable to contain the cleaning product, inside the box. The bag in this latter embodiment may not have a dispenser attached thereto, and instead may have an opening for bulk removal of cleaning product, e.g. at the top of the box.

The standard pail may be a plastic cylinder (open-head) 220 or other container (e.g. tight-head) 220', generally with a handle. Plastic pails 220, 220' have rounded edges, creating dead space between packages and limiting the amount of cleaning product that can be packed into a given space. Since the BIB packaging configuration 200 stores the cleaning product in a cube shape with straight edges, this permits more cleaning product to be packed into a given space, e.g. a pallet volume, than for pail packages.

The efficiencies of the BIB packaging configuration 200 include (1) the reduced use of plastics, since the BIB package uses mostly cardboard or similar material having limited amounts of plastic in the bag and the dispenser; and (2) the more efficient use of space, since the volume of cleaning product represents a higher percentage of the shipping volume than for the same volume of product packaged in a pail. The BIB packaging configuration 200 also has other advantages over the standard pail packaging configuration, such as ease of lifting and dispensing, and improved safety. Finally, the BIB packaging configuration 200 can make use of recycled materials in the cardboard portion, and in turn the cardboard portion of the packaging can itself be recycled.

In the first embodiment, the product efficiency calculator 10 compares factors for each packaging configuration, including: the capacity (e.g. in gallons); the total weight for the packaging material plus contents; the weight of plastic material used in the packaging configuration; the shipping volume associated with the particular packaging configuration; the number of units that can fit per pallet; the pallet volume; and the pallet volume per unit (e.g. gallon) of cleaning product (FIG. 1B). In one embodiment, the factors associated with the packaging configurations are displayed in package information panels 250, 252 (FIG. 1B).

Figure 1E:
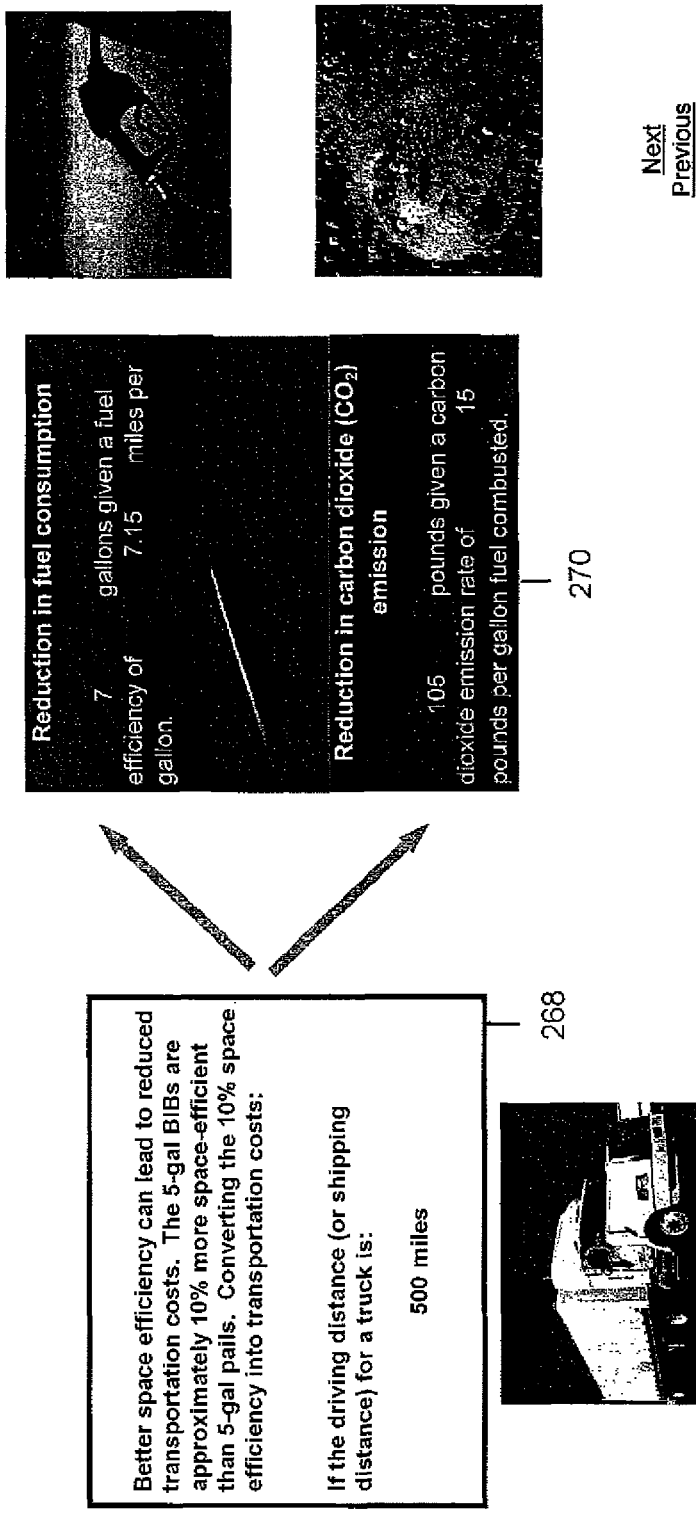

The consumer can enter a number of parameters, for example: the annual number of units of the cleaning product by indicating either the number of BIBs or pails of product (in either packaging configuration) or the number of gallons of product (FIG. 1B); in other embodiments, for example when the cleaning product is a powder, the units may be given in terms of weight. The number can be typed into an entry field and the units associated with the number (BIBs/pails or gallons) can be chosen from a drop-down menu, both of which are contained in a product consumption panel 254. In addition, a shipping distance and a transportation fuel efficiency can be selected using a distance input panel 268 and a fuel efficiency input panel 270, respectively (FIG. 1E).

The calculator 10 includes a number of separate pages, or modules, that the user can navigate between using navigation panels 240, 242, 256, 260, 266, 272, 280 (FIGS. 1A-1F). In some embodiments, the calculator 10 stores predetermined information pertaining to the respective containers used in the standard and improved packaging configurations, including, for example, the capacity, weight of plastic material, and shipping volume for the containers; and the units per pallet, total pallet volume, and pallet volume per gallon of product (FIG. 1B).

Based on one or more of these factors, the calculator 10 determines the material efficiency (FIG. 1C), space efficiency (FIG. 1D), transportation efficiency (FIG. 1E), and total annual cost savings (FIG. 1F) of using the BIB packaging configuration compared to the standard pail packaging configuration, for example, an open pail or a tight-head pail. In one embodiment, the overall cost savings is the sum of the storage cost savings plus the disposal cost savings (FIG. 1F). Determination of the packaging material efficiency compares the weight of the plastic material used for the BIB package to the amount used for the standard pail, as shown in a plastics savings panel 258 (FIG. 1C). In one embodiment, this difference is presented on an annualized basis by multiplying the per-unit reduction in plastics weight by the actual or estimated number of units consumed (FIG. 1C).

The savings in warehouse space are calculated by comparing the shipping volume of the BIB package to the shipping volume of the standard pail package, as shown in a warehouse savings panel 262 (FIG. 1D). In one embodiment, the comparison is based on the assumption that the packages are stored on pallets, and thus is based on the pallet volume per gallon (FIG. 1D). In addition to the more efficient package design, the BIB package can use warehouse space more efficiently because the BIB packages can be stacked up to four units high, as opposed to only two units high for the pails.

The savings in disposal costs are calculated by comparing the volumes of the empty BIB containers to the empty pails, for the same amount of cleaning product delivered, as shown in a landfill volume savings panel 264 (FIG. 1D). The BIB package offers other space-saving disposal benefits that would be realized on top of the more efficient package volume, including the ability to break down the cardboard packages prior to disposal. Finally, it also may be possible to recycle the box portion of the BIB.

As a result of the more efficient use of space, the BIB package allows a greater amount of cleaning product to be loaded onto a given truck or other transportation vehicle, reducing transportation costs, fuel consumption, and pollutant generation, shown in a fuel consumption and emissions panel 270 (FIG. 1E). Given an optional user input of the distance that the product is shipped, using the distance input panel 286, and the fuel efficiency of the transportation vehicle, using the fuel consumption and emissions panel 270, the calculator 10 can determine the transportation efficiencies associated with shipping products in BIB packages instead of pails (FIG. 1E). Based on this information, the fuel consumption and emissions panel 270 displays values including the reduction in the amount of greenhouse gases such as carbon dioxide ($CO_2$) associated with the use of the improved packaging configuration.

Finally, based on the cost of landfilling materials, for example, in dollars per ton, and the cost of warehouse storage, for example, in dollars per cubic foot per year, the calculator 10 can determine the total annual cost savings associated with the use of the improved BIB package configuration rather than the standard pail configuration (FIG. 1F). The landfill cost input and annual savings are displayed by a landfill cost panel 274, and the warehouse cost input and annual savings are displayed by a warehouse cost panel 276 (FIG. 1F). The total cost savings, as well as the separate disposal and storage savings from using the improved BIB packaging configuration instead of the standard pail packaging configuration, are then presented to the consumer in a total cost savings panel 278 (FIG. 1F). Other, qualitative improvements associated with use of the BIB package, such as the improved safety of a more stable package, are shown in an information panel 282 (FIG. 1F).

In other embodiments, such as those described below, the calculator program compares other packaging configurations to the standard packaging configuration, taking into account differences in concentration of the cleaning product stored in the respective packages.

Second Embodiment

Container with a Built-in Measuring Spout

In a second embodiment, a product efficiency calculator 10' calculates and presents efficiencies associated with the use of an improved packaging configuration having a built-in measuring spout (FIG. 2A) compared to a standard pail packaging configuration, for example, a 2.5- or a 5-gallon pail (FIG. 2B). One example of a container having a built-in measuring spout is the container used as part of the Accu-Mix® portion control system sold by Johnson Diversey, Inc. (Sturtevant, Wis.) (FIG. 2B). Using a container with a built-in measuring spout permits the use of a more concentrated solution of liquid cleaning solution, which in turn increases packaging efficiency. The built-in measuring spout provides for accurate measurement of small volumes of liquid, in the range of a few ounces, so that dilution rates on the order of 1:1000 can be reliably achieved.

The calculator 10' calculates the efficiencies realized as a result of purchasing and using a container with a built-in measuring spout, which facilitates the use of a concentrated stock of liquid cleaning product, compared to the purchase and use of a standard pail packaging configuration containing final-strength liquid cleaning product. In one embodiment, the liquid cleaning product in the improved container is at a thousand-fold (i.e. 1000×) concentration relative to the final strength liquid in the standard pail (FIG. 2C).

Figure 2C:

The consumer can enter a number of parameters, or default values may be supplied, for example: the annual number of units of the liquid cleaning product in either the standard or the improved packaging configuration (FIG. 2C); the dilution rates of the liquid cleaning product contained in the standard and the improved packaging configurations (FIG. 2C); the pail size of the standard packaging configuration (FIG. 2B); a shipping distance (FIG. 2F); a transportation fuel efficiency (FIG. 2F); a cost of landfilling waste (FIG. 2G); and a cost of warehouse storage space (FIG. 2G).

The calculator 10' includes a number of separate pages, or modules, that the user can navigate between using navigation panels 300, 308, 316, 320, 324, 330, 338, 348, 364 (FIGS. 2A-2I).

Based on the size of the respective containers, the calculator 10' determines for each container the weight of plastics; the shipping volume; the units per pallet; the pallet volume; and the pallet volume per gallon, i.e. the pallet volume per gallon of liquid cleaning product shipped (FIG. 2B). In some embodiments, these values are predetermined based on actual measurements of such containers and are stored on a storage medium 18 such as a memory device and are recalled and displayed by the calculator 10'. The values are displayed in package information panels 302, 304 (FIG. 2B).

In some embodiments, the calculator 10' queries the consumer regarding whether the products are used at a single dilution rate for all applications and whether the annual consumption of product, in either the standard or improved packaging configuration, is known; these queries are shown in a query panel 306 (FIG. 2B).

Based on a selected packaging type and the number of units of that packaging type that are consumed per year (both entered via a first annual consumption panel 310), as well as the dilution rate for the product in each type of container (entered via a first dilution rate panel 312), the calculator 10' determines the number of units of each type of container that are consumed per year (FIG. 2C). The determination, which is a known or estimated annual consumption, is shown in a second annual consumption panel 314 (FIG. 2C). Finally, based on the fact that use of the improved container with a built-in measuring spout facilitates using a more concentrated form of the liquid cleaning product, the calculator 10' determines the overall efficiencies of the improved packaging system (FIGS. 2D, 2E, 2F, and 2G).

Figure 2F:
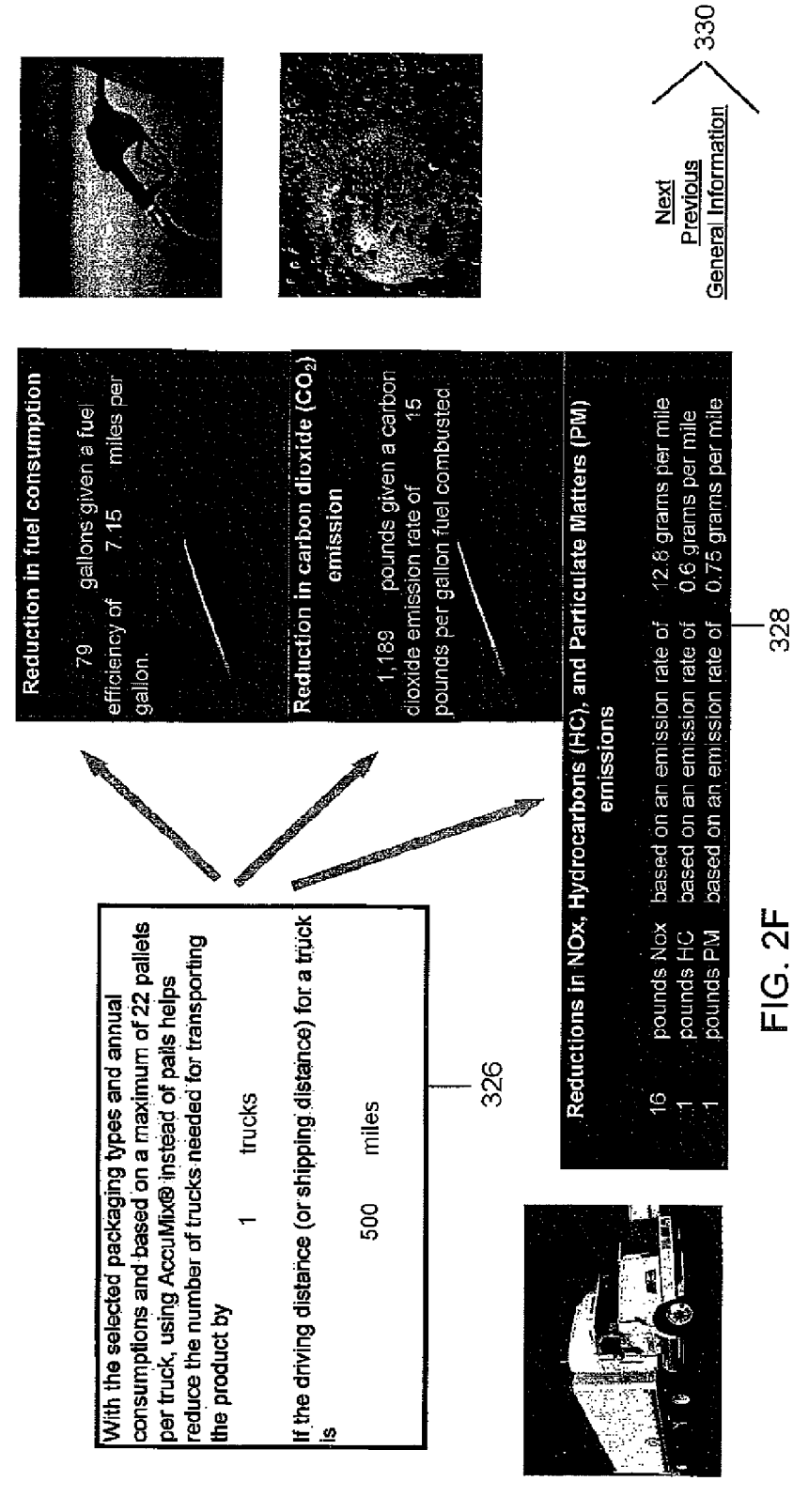

The efficiencies include packaging material efficiency (shown in a plastics savings panel 318; FIG. 2D), packaging space efficiency (shown in a warehouse savings panel 322; FIG. 2E), and transportation efficiency (shown in a distance panel 326 and a fuel consumption and emissions panel 328; FIG. 2F), which can translate into overall cost savings from using the improved packaging configuration compared to the standard configuration (shown in a total cost savings panel 336; FIG. 2G). In one embodiment, the overall cost savings is calculated as the sum of the storage cost savings plus the disposal cost savings (FIG. 2G). The storage cost savings are shown in the warehouse cost panel 334 and the disposal cost savings are shown in the landfill cost panel 332 (FIG. 2G). In another embodiment, the calculator 10' determines how many fewer trucks are needed for transportation of the liquid cleaning product due to the use of the improved packaging configuration, based on the number of pallets that can fit into one truck as well as the net annual reduction in the packaging space (shown in the distance panel 326; FIG. 2F).

Determination of the packaging material efficiency compares the weight of the plastic material used for the improved packaging configuration to the amount used for the standard packaging configuration. In one embodiment, this difference is presented on an annualized basis by multiplying the per-unit reduction in plastics weight by the actual or estimated number of units consumed (shown in the plastics savings panel 318; FIG. 2D).

The savings in warehouse space are calculated by comparing the shipping volume of the improved package to the shipping volume of the standard package. In one embodiment, the comparison is based on the assumption that the packages are stored in pallets, and thus is based on the pallet volume per gallon (FIG. 2B).

The savings in disposal costs are calculated by comparing the net volume of packaging material that would be generated with the improved packaging configuration to the volume that would be generated using the standard configuration. In embodiment, the savings in disposal costs are attributable in large part to the higher concentration of the liquid cleaning product that can be used with the improved packaging configuration (FIG. 2G).

As a result of facilitating the use of a higher concentration of cleaning solution, the improved packaging configuration requires less liquid cleaning solution to be shipped in order to produce the same amount of liquid cleaning solution at the final working concentration. This reduction in the amount of material to be shipped in turn reduces transportation costs, fuel consumption, and pollutant generation (FIG. 2F). Given an optional user input of the distance that the product is shipped and the fuel efficiency of the transportation vehicle, the calculator 10' determines the transportation efficiencies associated with shipping products in the improved packaging configuration instead of the standard packaging configuration (shown in the fuel consumption and emissions panel 328; FIG. 2F). Based on this information, the fuel consumption and emissions panel 328 displays values including the reduction in the amount of greenhouse gases and other pollutants such as carbon dioxide ($CO_2$), nitrogen oxide ($NO_x$), hydrocarbons (HC), and particulate matter (PM), associated with the use of the improved packaging configuration.

Finally, based on the cost of landfilling materials, for example, in dollars per ton, and the cost of warehouse storage, for example, in dollars per cubic foot per year, the calculator 10' can determine the total annual cost savings associated with the use of the improved packaging configuration rather than the standard pail configuration (shown in the total cost savings panel 336; FIG. 2G). The total cost savings as well as the separate disposal and storage savings from using the improved packaging configuration instead of the standard pail packaging configuration are then presented to the consumer.

Figure 2H:
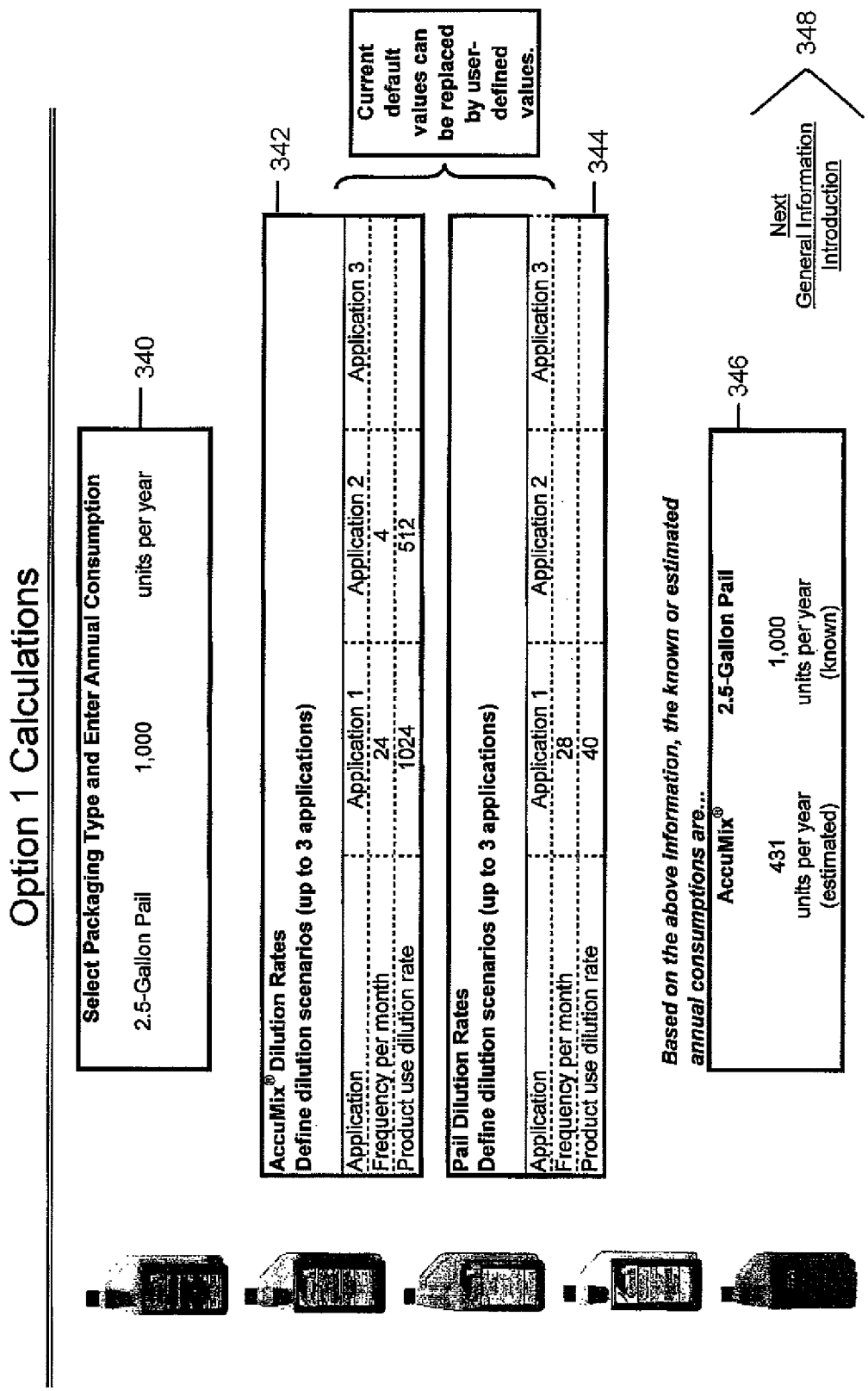

In one variation of the second embodiment, the calculator 10' determines the amount of product usage, and subsequent packaging-related efficiencies, based on multiple different dilution rates of the concentrated liquid cleaning solution used for different cleaning situations (FIG. 2H). For example, the consumer may use the cleaning product at higher concentrations (i.e. less diluted, for example 1:512) for heavy soil and at lower concentrations (i.e. more dilute, for example 1:1024) for medium soil. The package type and annual consumption are entered and shown in a third annual consumption panel 340 (FIG. 2H). The respective dilution rates for the product as stored in the improved and the standard packaging configurations are shown in a second dilution rate panel 342 and a third dilution rate panel 344 (FIG. 2H).

In another variation of the second embodiment, the calculator 10' can further determine consumption based on the amount of surface area to be cleaned in a particular application, the number of locations having that amount of surface area, and the coverage rate of the liquid cleaning product when used in its diluted forms (FIG. 2I). The consumer can optionally enter values including: frequency of application per month; dilution rate of the product in such applications; number of locations; cleanable area per location; and coverage rate of product in final, diluted form (e.g. in sq. ft. per gal.), for the liquid cleaning product contained in the standard and the improved packaging configurations. The frequency of application per month and the product use dilution rates are entered in a fourth dilution rate panel 350 and a fifth dilution rate panel 352 (FIG. 2I), for the improved and standard packaging configurations, respectively. Other information for determining product usage based on surface area are entered and displayed in panels 354, 356, 358, and 360. The estimated annual consumptions of product in the standard and improved packaging configurations, based on surface areas to be cleaned at particular dilution rates, are shown in a fourth annual consumption panel 362 (FIG. 2I).

For example, if a consumer has ten locations having 20,000 square feet of area that must be cleaned daily, then there are 200,000 square feet of area to clean per day. Given that the liquid cleaning product at its final concentration covers 2,000 square feet per gallon, 100 gallons of final-strength cleaning product will be required per day. Since the improved packaging facilitates the use of stock liquid cleaning solution at a much higher concentration than in the standard packaging configuration (e.g. 1000-fold for the improved packaging compared to 40-fold for the standard pail), far fewer units of the improved package need to be used in this case to achieve the same end: on an annual basis, the consumer would use 141 units of the improved package as compared to 328 units of the standard pail package. In addition, each of the improved packaging configuration units is smaller, at 32 ounces, than the standard pail packaging configuration, at 2.5 gallons.

In either of the two variations on the second embodiment discussed above, once the calculator 10' has determined the number of units of product that are consumed of the standard and the improved packaging configurations, the remaining calculations of efficiencies are equivalent to those already described above for the second embodiment.

Third Embodiment

Ready-to-Dispense Container

Figure 3B:
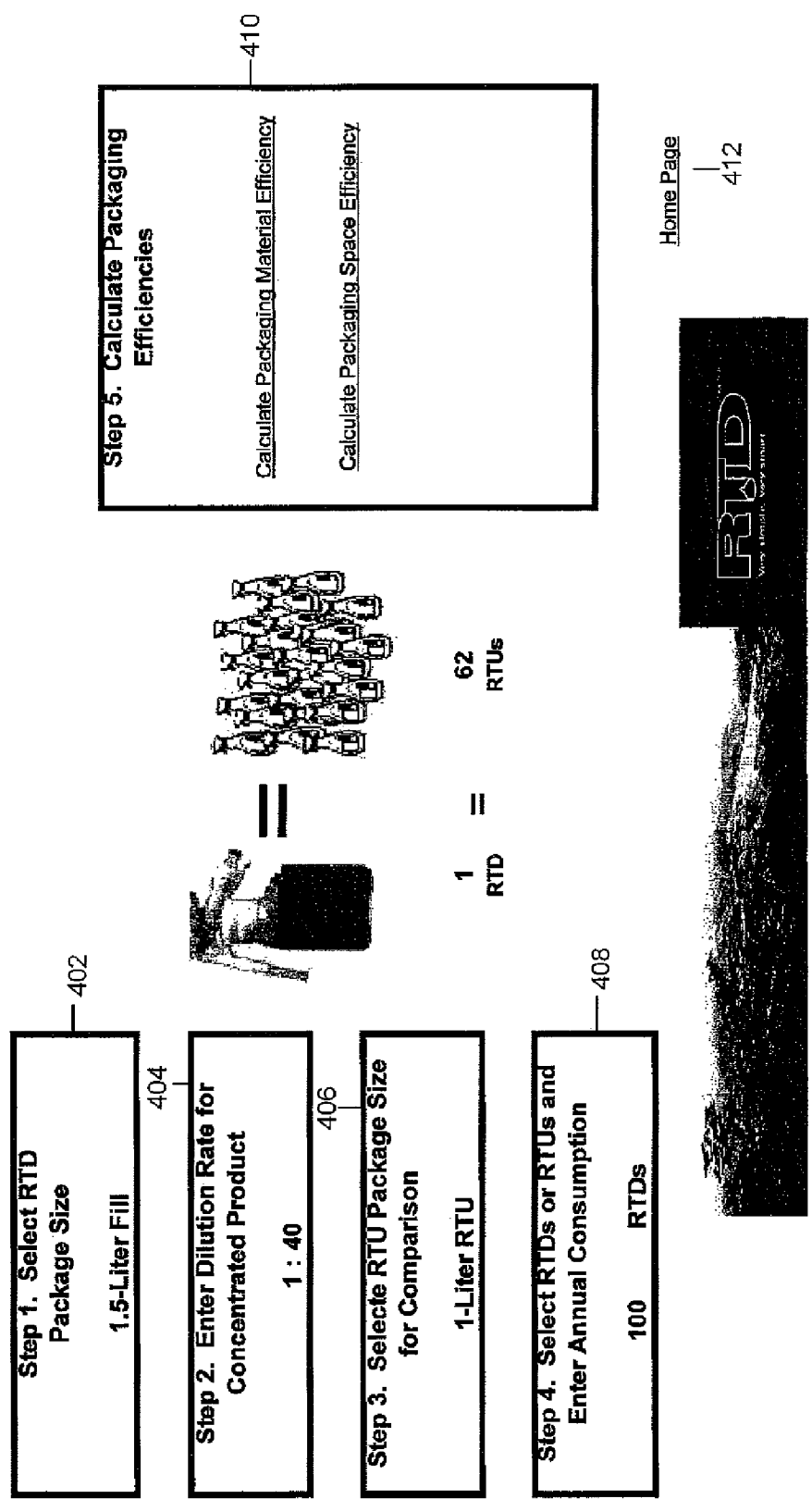

In a third embodiment, a product efficiency calculator 10" calculates the efficiencies associated with the use of an improved container that facilitates use of a more concentrated form of the product. In this embodiment, the improved packaging configuration is a ready-to-dispense (RTD) container (FIG. 3A) that dilutes a concentrated stock solution simultaneous with delivery, either by filling into containers or directly spraying in an application. One standard type of packaging configuration that the ready-to-dispense package would replace is a ready-to-use (RTU) package such as a hand-held spray bottle containing liquid cleaning product at a final concentration (FIG. 3B). Depending on the degree of concentration, one RTD container with concentrated liquid cleaning product can replace dozens or more RTU containers having liquid cleaning product at a final, end-use concentration. Thus, even though one RTD container may have more plastic material and a larger volume than one RTU container, the fact that a single RTD container replaces so many RTU containers produces a large net efficiency in terms of space and materials.

The calculator 10" includes a number of separate pages, or modules, that the user can navigate between using navigation panels 400, 410, 412 (FIGS. 3A-3B).

To compare the efficiencies associated with the use of the improved RTD packaging configuration instead of the standard RTU packaging configuration, the calculator 10" allows the consumer to input several values, including an RTD package size (e.g. 1.5 liter) using an RTD package size panel 402, a dilution rate of the concentrated liquid in the RTD package (e.g. 1:40) using an RTD dilution rate panel 404, an RTU package size (e.g. 1 liter) using an RTU package size panel 406, and an annual consumption rate of either RTD packages or RTU packages (e.g. 100 RTDs) using an annual consumption panel 408 (FIG. 3B). Depending on whether the annual consumption of RTD packages or RTU packages is specified, the other consumption value can be estimated, based on the dilution rate in the RTD package and the respective volumes of material in the RTD and RTU packages. For example, at a dilution rate of 1:40 and given that the RTD package is 1.5 liters while the RTU package is 1 liter, a single RTD package is equivalent to 62 RTU packages (FIG. 3B).

Figure 3C:
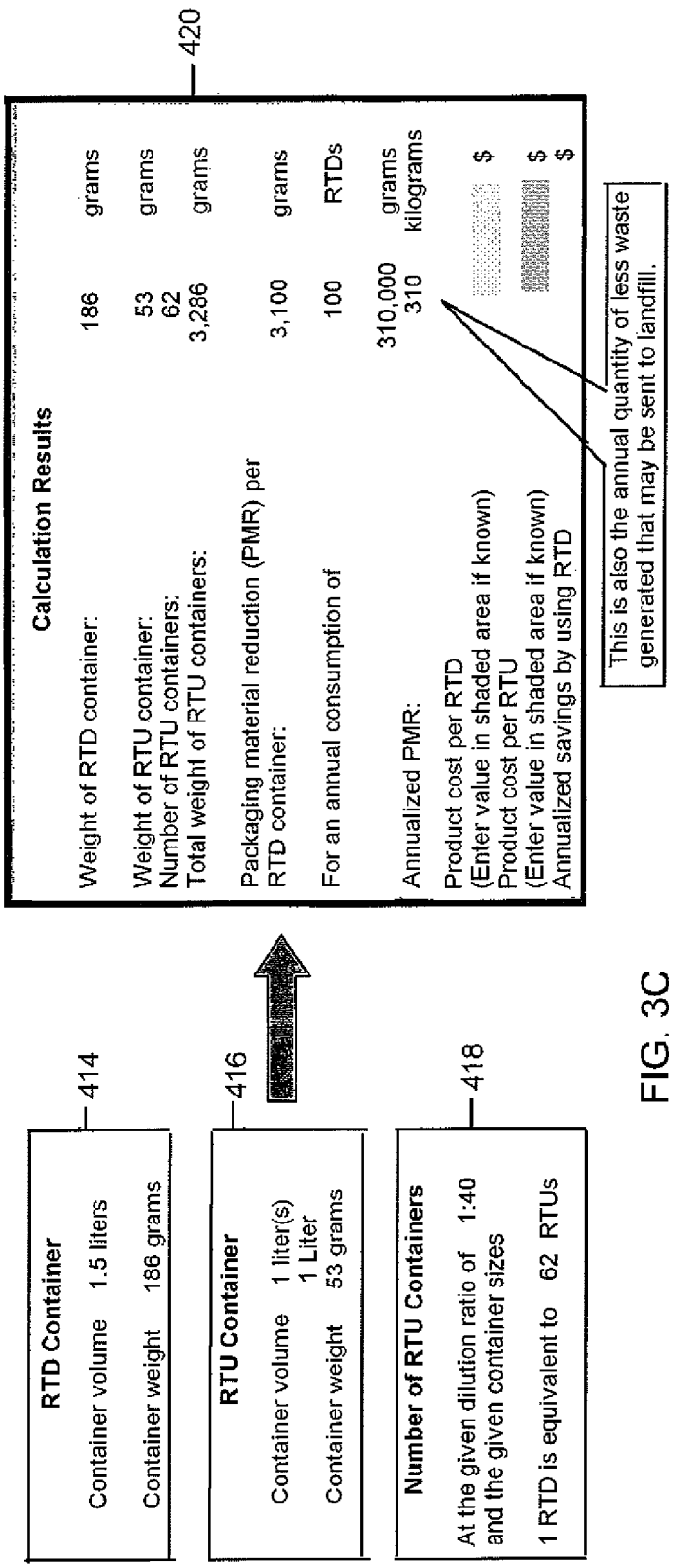

Based on the given information, the calculator 10" determines the packaging material efficiency associated with the use of the RTD packaging configuration in place of the RTU packaging configuration (FIG. 3C). The calculator 10" first determines the number of RTU packages that is equivalent to a single RTD package, i.e. the number of RTU packages required to deliver the same volume of end-use strength liquid cleaning product as one RTD package, shown in a first container equivalent panel 418 (FIG. 3C). The number of RTU packages is then multiplied times the weight of plastics material in one RTU package (shown in a first RTU packaging panel 416), and the weight of plastics in one RTD package (shown in a first RTD packaging panel 414) is subtracted from this value to arrive at the packaging material efficiency per RTD package. The packaging material efficiency is presented to the consumer as a function of the weight of the plastic material that is saved for each RTD package that is used, for example, the number of grams of plastic material saved (shown in a packaging material efficiency panel 420; FIG. 3C). If it is estimated or known that the consumer uses more than one RTD package per year, the per-RTD packaging material efficiency value can be multiplied by the number of RTD packages to arrive at the total packaging material efficiency value (also shown in the packaging material efficiency panel 420; FIG. 3C).

Figure 3D:
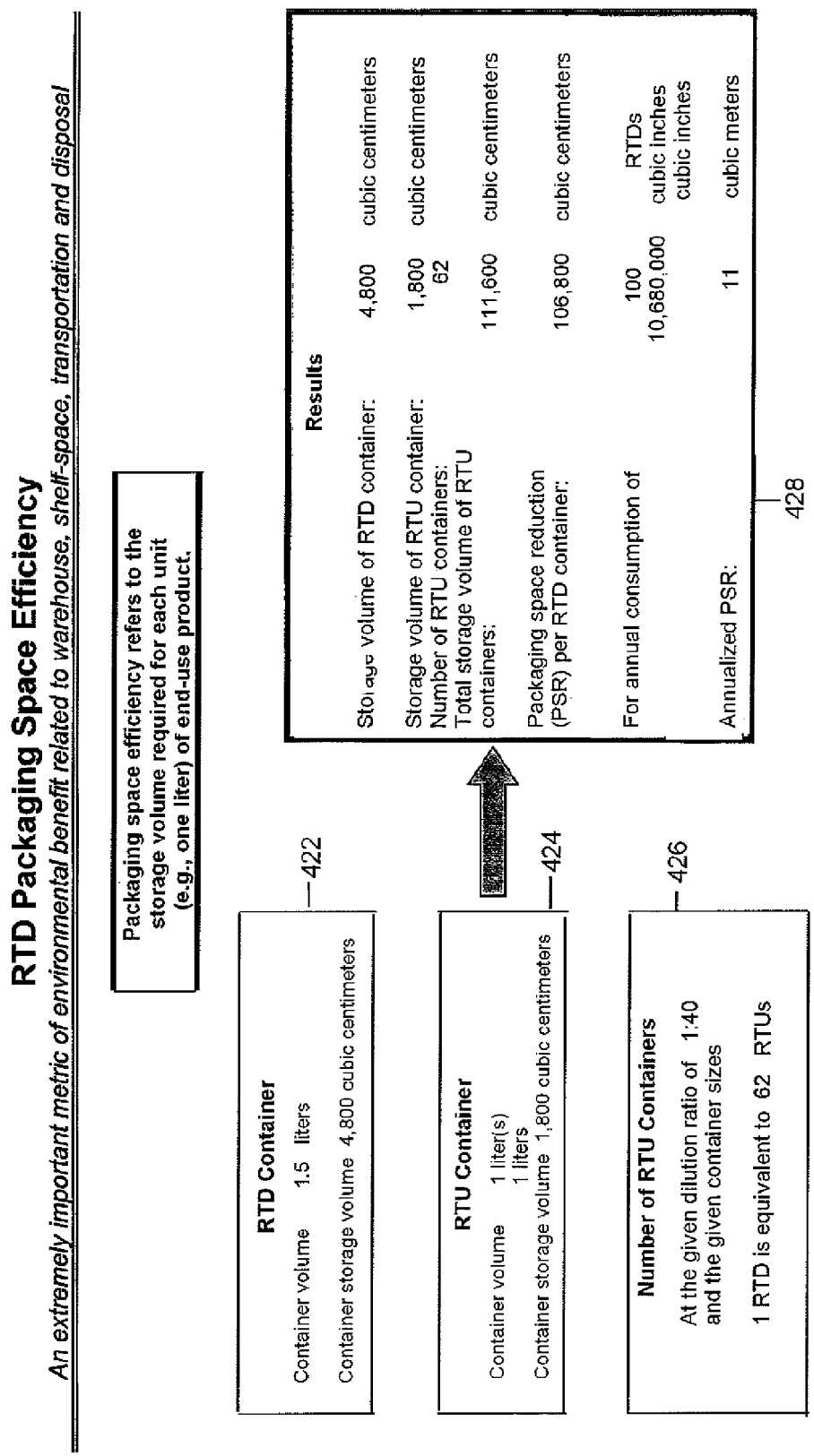

The calculator 10" also determines the packaging space efficiency associated with the use of the RTD packaging configuration instead of the RTU packaging configuration (see second RTD packaging panel 422 and second RTU packaging panel 424; FIG. 3D). As with the packaging material efficiency, the use of concentrated liquid cleaning solution that is facilitated by the improved RTD packaging configuration means that many fewer units of liquid need to be purchased, shipped, stored, and disposed, translating into efficiencies and savings (shown in a second container equivalent panel 426; FIG. 3D). Although in the example above the single RTD package is larger (4,800 cubic centimeters for a 1.5 liter container) than a single RTU package (1,800 cubic centimeters for a 1.0 liter container), the fact that one RTD container is equivalent to 62 RTU packages means that there is a savings of 106,800 cubic centimeters in packaging space for each RTD container that is used (shown in a packaging space efficiency panel 428; FIG. 3D).

What is claimed is:

1. A method of using a computer system to inform a consumer about an efficiency associated with an improved packaging configuration for a cleaning product relative to a standard packaging configuration for the cleaning product, the computer system comprising an input device, an output device, a memory, and a processor, the method comprising:

inputting values from the consumer into the computer system using the input device and storing the input values in the memory, the input values including at least one of,
   a number of units of cleaning product that are purchased by the consumer per year in the standard packaging configuration;
   a number of units of cleaning product that are purchased by the consumer per year in the improved packaging configuration;
   a volume of the cleaning product in one unit of the standard packaging configuration;
   a volume of the cleaning product in one unit of the improved packaging configuration;
   a concentration of the cleaning product in the standard packaging configuration;
   a concentration of the cleaning product in the improved packaging configuration;
   a shipping distance; and
   a transportation fuel efficiency;

using the processor to calculate a packaging space efficiency based on the values input by the consumer or on one or more predetermined values, comprising calculating a reduction in a shipping volume, a storage volume, or a disposal volume required to deliver one unit volume of end-use cleaning product using the improved packaging configuration compared to the standard packaging configuration, based on the volume and concentration of cleaning product in the standard packaging configuration and the volume and concentration of cleaning product in the improved packaging configuration;

using the processor to calculate a packaging material efficiency based on the values input by the consumer or on one or more predetermined values, comprising calculating a reduction in the weight of plastic packaging material required to deliver one unit volume of end-use cleaning product using the improved packaging configuration as compared to the weight of plastic packaging material required to deliver one unit volume of end-use cleaning product using the standard packaging configuration, based on the volume and concentration of cleaning product in the standard packaging configuration and the volume and concentration of cleaning product in the improved packaging configuration;

calculating using the processor a total cost savings from using the improved packaging configuration comprising calculating a storage cost savings based on the shipping-associated packaging space efficiency and the storage cost per unit volume;

calculating a disposal cost savings based on the packaging material efficiency and the disposal cost per unit weight; and adding the storage cost savings and the disposal cost savings; and displaying to the consumer using the output device a reduction in the amount of carbon dioxide associated with the use of the improved packaging configuration along with at least one of the following values the total cost, the disposal cost savings, or the storage cost savings for the standard packaging configuration;

the total cost, the disposal cost, or the storage cost for the improved packaging configuration;

the packaging space efficiency; and the packaging material efficiency, wherein the cleaning product is one of a liquid and a powder.

2. The method of claim 1, wherein the standard packaging configuration is a 2.5 gallon pail, a 5 gallon pail, or a ready-to-use container.

3. The method of claim 2, wherein the improved packaging configuration is a bag-in-box, a ready-to-dispense container, or a container with a built-in measuring spout.

4. The method of claim 3, wherein the cleaning product in the improved packaging configuration is more concentrated than the cleaning product in the standard packaging configuration.

5. The method of claim 1, wherein the shipping cost for the standard packaging configuration or the improved packaging configuration is determined based on at least one of the transportation fuel efficiency and the shipping distance.

6. The method of claim 1, wherein at least one of the packaging material efficiency and the packaging space efficiency is determined based on a user-defined value.

7. The method of claim 1, wherein at least one of the packaging material efficiency and the packaging space efficiency is determined based on a default value.

8. The method of claim 1, wherein at least one of the packaging material efficiency and the packaging space efficiency is determined based on the concentration of the cleaning product in the standard packaging configuration and the concentration of the cleaning product in the improved packaging configuration.

9. The method of claim 1, wherein at least one of the packaging material efficiency and the packaging space efficiency is determined based on the volume in one unit of the cleaning product in the standard packaging configuration and the volume in one unit of the cleaning product in the improved packaging configuration.

10. The method of claim 1, wherein displaying to the consumer using the output device at least one value comprises displaying a non-numerical representation of the at least one value.

11. The method of claim 1, wherein the cleaning product is a liquid cleaning product.

12. A computer-based system for informing a consumer about an efficiency of an improved packaging configuration for a cleaning product, said system comprising:

a processor; and a storage medium operably coupled to the processor, wherein the storage medium includes, program instructions executable by the processor for inputting values from the consumer into the computer system using the input device and storing the input values in the memory, the input values including at least one of, a number of units of cleaning product that are purchased by the consumer per year in the standard packaging configuration;

a number of units of cleaning product that are purchased by the consumer per year in the improved packaging configuration;

a volume of the cleaning product in one unit of the standard packaging configuration;

a volume of the cleaning product in one unit of the improved packaging configuration;

a concentration of the cleaning product in the standard packaging configuration;

a concentration of the cleaning product in the improved packaging configuration;

a shipping distance; and a transportation fuel efficiency;

using the processor to calculate a packaging space efficiency based on the values input by the consumer or on one or more predetermined values, comprising calculating a reduction in a shipping volume, a storage volume, or a disposal volume required to deliver one unit volume of end-use cleaning product using the improved packaging configuration compared to the standard packaging configuration, based on the volume and concentration of cleaning product in the standard packaging configuration and the volume and concentration of cleaning product in the improved packaging configuration;

using the processor to calculate a packaging material efficiency based on the values input by the consumer or on one or more predetermined values, comprising calculating a reduction in the weight of plastic packaging material required to deliver one unit volume of end-use cleaning product using the improved packaging configuration as compared to the weight of plastic packaging material required to deliver one unit volume of end-use cleaning product using the standard packaging configuration, based on the volume and concentration of cleaning product in the standard packaging configuration and the volume and concentration of cleaning product in the improved packaging configuration;

calculating using the processor a total cost savings from using the improved packaging configuration comprising calculating a storage cost savings based on the shipping-associated packaging space efficiency and the storage cost per unit volume;

calculating a disposal cost savings based on the packaging material efficiency and the disposal cost per unit weight; and adding the storage cost savings and the disposal cost savings; and displaying to the consumer using the output device a reduction in the amount of carbon dioxide associated with the use of the improved packaging configuration along with at least one of the following values the total cost, the disposal cost savings, or the storage cost savings for the standard packaging configuration;

the total cost, the disposal cost, or the storage cost for the improved packaging configuration;

the packaging space efficiency; and the packaging material efficiency, wherein the cleaning product is one of a liquid and a powder.

13. The computer-based system of claim 12, wherein the cleaning product is a liquid cleaning product.

14. A non-transitory computer-readable storage medium having an executable program stored thereon, wherein the program instructs a microprocessor according to the following instructions, the instructions comprising:

first instructions executable on a computational device for inputting values from the consumer into the computer system using the input device and storing the input values on the storage media, the input values including at least one of a number of units of cleaning product that are purchased by the consumer per year in the standard packaging configuration; a number of units of cleaning product that are purchased by the consumer per year in the improved packaging configuration; a volume of the cleaning product in one unit of the standard packaging configuration; a volume of the cleaning product in one unit of the improved packaging configuration; a concentration of the cleaning product in the standard packaging configuration; a concentration of the cleaning product in the improved packaging configuration; a shipping distance; and a transportation fuel efficiency;

second instructions executable on the computational device for using the processor to calculate a packaging space efficiency based on the values input by the consumer or on one or more predetermined values, comprising calculating a reduction in a shipping volume, a storage volume, or a disposal volume required to deliver one unit volume of end-use cleaning product using the improved packaging configuration compared to the standard packaging configuration, based on the volume and concentration of cleaning product in the standard packaging configuration and the volume and concentration of cleaning product in the improved packaging configuration;

third instructions executable on the computational device for using the processor to calculate a packaging material efficiency based on the values input by the consumer or on one or more predetermined values, comprising calculating a reduction in the weight of plastic packaging material required to deliver one unit volume of end-use cleaning product using the improved packaging configuration as compared to the weight of plastic packaging material required to deliver one unit volume of end-use cleaning product using the standard packaging configuration, based on the volume and concentration of cleaning product in the standard packaging configuration and the volume and concentration of cleaning product in the improved packaging configuration;

fourth instructions executable on the computational device for calculating using the processor a total cost savings from using the improved packaging configuration comprising calculating a storage cost savings based on the shipping-associated packaging space efficiency and the storage cost per unit volume; calculating a disposal cost savings based on the packaging material efficiency and the disposal cost per unit weight; and adding together the storage cost savings plus the disposal cost savings; and fifth instructions executable on the computational device for displaying to the consumer using the output device a reduction in the amount of carbon dioxide associated with the use of the improved packaging configuration along with at least one of the total cost, the disposal cost savings, or the storage cost savings for the standard packaging configuration; the total cost, the disposal cost, or the storage cost for the improved packaging configuration; the packaging space efficiency; and the packaging material efficiency, wherein the cleaning product is one of a liquid and a powder.

15. The non-transitory computer-readable storage medium of claim 14, wherein the cleaning product is a liquid cleaning product.

16. A method of using a computer system to inform a consumer about an efficiency associated with an improved packaging configuration for a cleaning product relative to a standard packaging configuration for the cleaning product, the computer system comprising an input device, an output device, a memory, and a processor, the method comprising:

inputting values from the consumer into the computer system using the input device and storing the input values in the memory, the input values including at least one of, a number of units of cleaning product that are purchased by the consumer per year in the standard packaging configuration;

a number of units of cleaning product that are purchased by the consumer per year in the improved packaging configuration;

a volume of the cleaning product in one unit of the standard packaging configuration;

a volume of the cleaning product in one unit of the improved packaging configuration;

a concentration of the cleaning product in the standard packaging configuration;

a concentration of the cleaning product in the improved packaging configuration;

a shipping distance; and a transportation fuel efficiency;

using the processor to calculate a packaging space efficiency based on the values input by the consumer or on one or more predetermined values, comprising calculating a reduction in a shipping volume, a storage volume, or a disposal volume required to deliver one unit volume of end-use cleaning product using the improved packaging configuration compared to the standard packaging configuration, based on the volume and concentration of cleaning product in the standard packaging configuration and the volume and concentration of cleaning product in the improved packaging configuration;

using the processor to calculate a packaging material efficiency based on the values input by the consumer or on one or more predetermined values, comprising calculating a reduction in the weight of plastic packaging material required to deliver one unit volume of end-use cleaning product using the improved packaging configuration as compared to the weight of plastic packaging material required to deliver one unit volume of end-use cleaning product using the standard packaging configuration, based on the volume and concentration of cleaning product in the standard packaging configuration and the volume and concentration of cleaning product in the improved packaging configuration;

calculating using the processor a total cost savings from using the improved packaging configuration comprising calculating a storage cost savings based on the shipping-associated packaging space efficiency and the storage cost per unit volume;

calculating a disposal cost savings based on the packaging material efficiency and the disposal cost per unit weight; and adding the storage cost savings and the disposal cost savings; and displaying to the consumer using the output device a reduction in the amount of carbon dioxide associated with the use of the improved packaging configuration along with at least one of the following values the total cost, the disposal cost savings, or the storage cost savings for the standard packaging configuration;

the total cost, the disposal cost, or the storage cost for the improved packaging configuration;

the packaging space efficiency; and the packaging material efficiency, wherein the standard packaging configuration is a 2.5 gallon pail, a 5 gallon pail, or a ready-to-use container, wherein the improved packaging configuration is a bag-in-box, a ready-to-dispense container, or a container with a built-in measuring spout, and wherein the cleaning product is one of a liquid and a powder.

* * * * *